Figure 11:
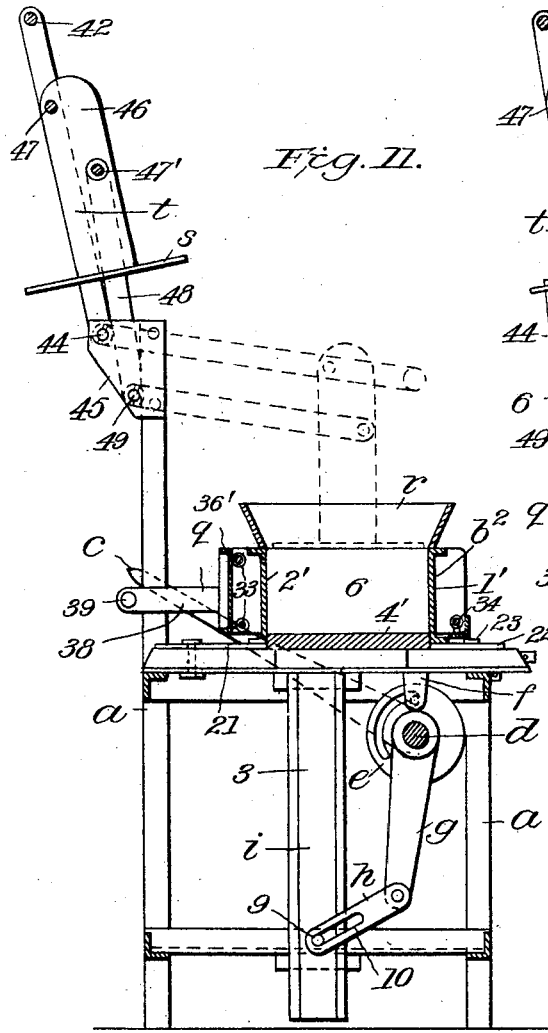

No. 826,289. PATENTED JULY 17, 1906.
T. F. TIMBY.
PLASTIC BLOCK MOLDING MACHINE.
APPLICATION FILED FEB. 15, 1906.
5 SHEETS—SHEET 1.
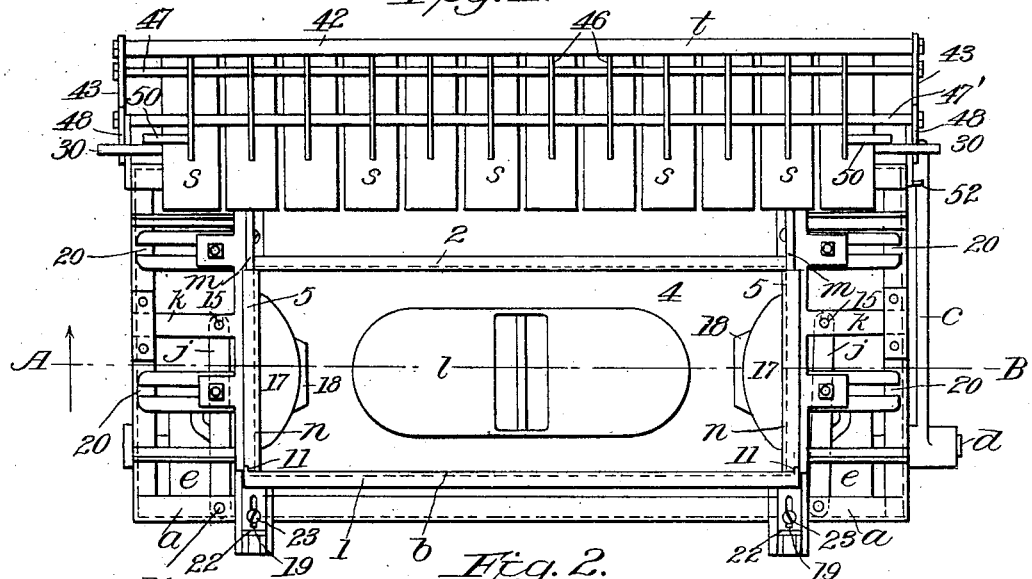

No. 826,289. PATENTED JULY 17, 1906.
T. F. TIMBY.
PLASTIC BLOCK MOLDING MACHINE.
APPLICATION FILED FEB. 15, 1906.
5 SHEETS—SHEET 2.
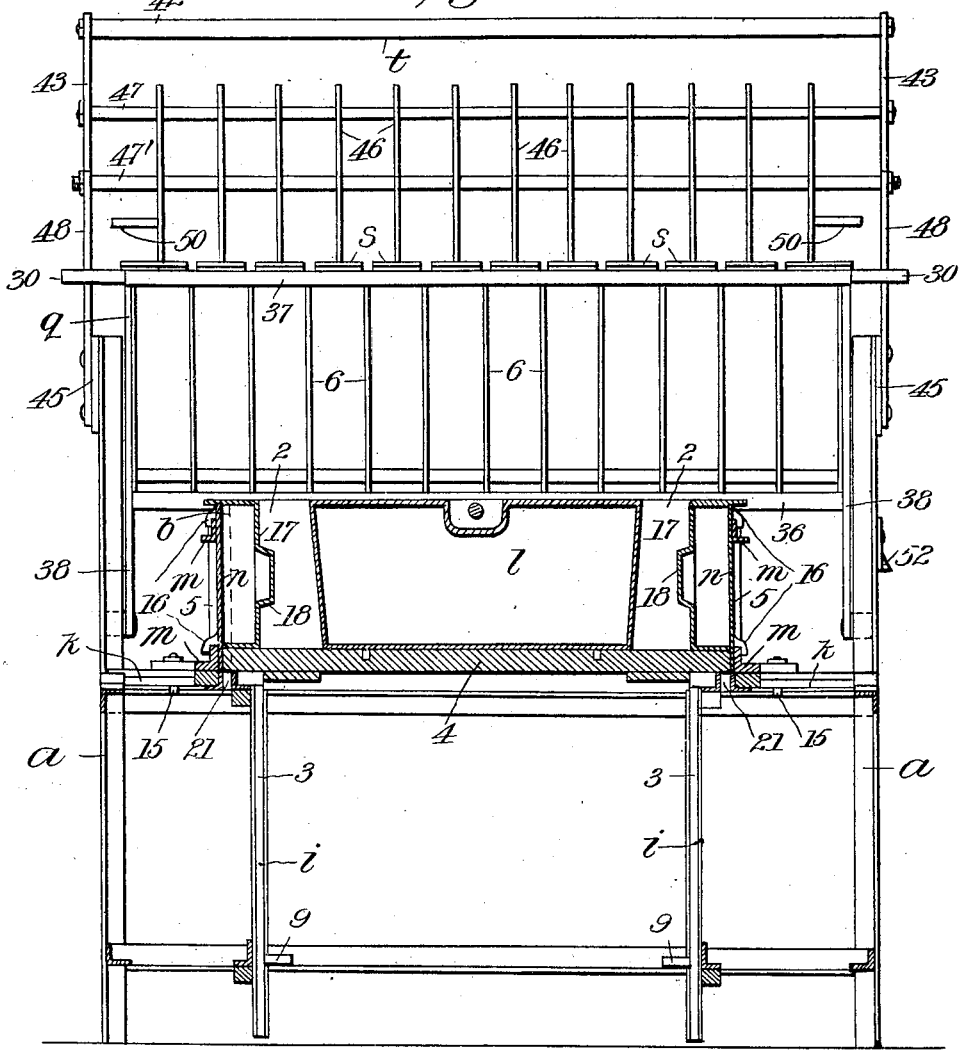
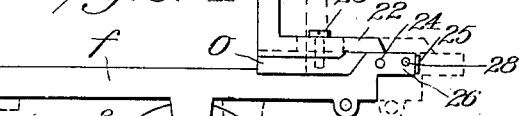
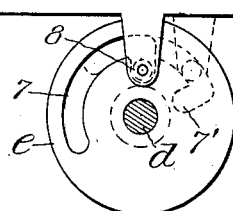
WITNESSES: INVENTOR
Theodore F. Timby
BY
Attorney

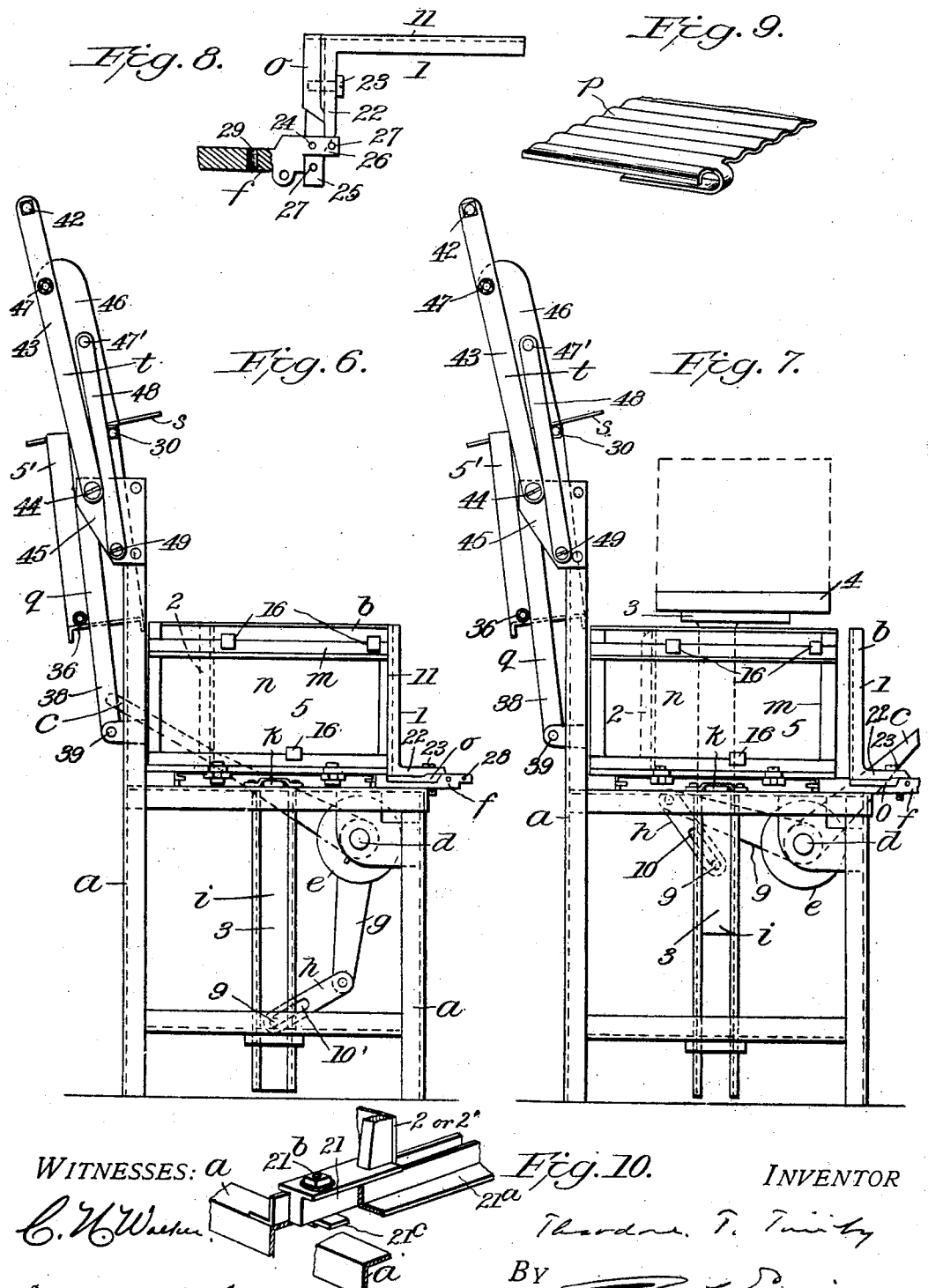

No. 826,289. PATENTED JULY 17, 1906.
T. F. TIMBY.
PLASTIC BLOCK MOLDING MACHINE.
APPLICATION FILED FEB. 15, 1906.

5 SHEETS—SHEET 4.

WITNESSES:
C. H. Walker.
Delbert H. Decker.

INVENTOR
Theodore F. Timby
BY
Attorney

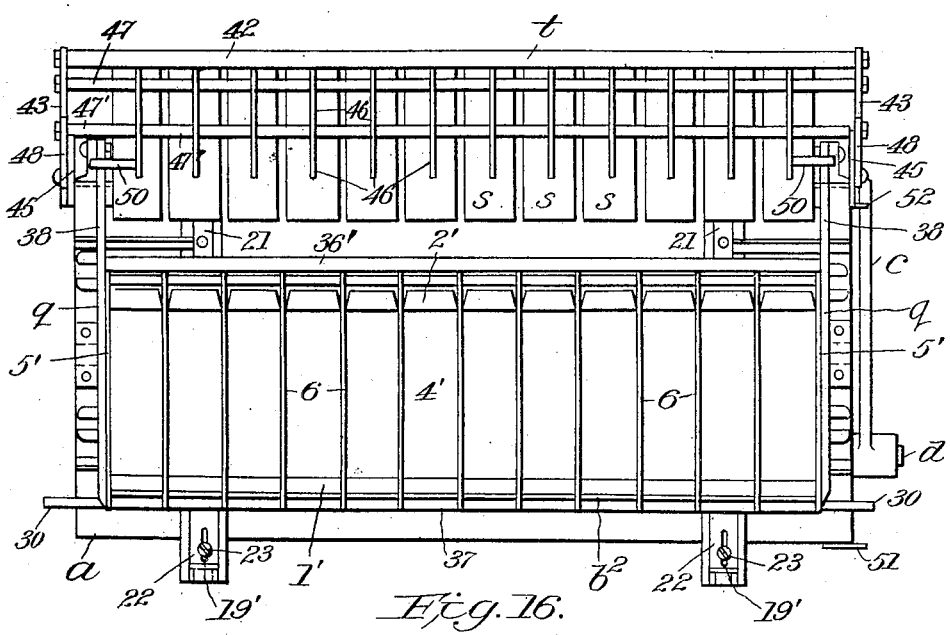

UNITED STATES PATENT OFFICE.

THEODORE F. TIMBY, OF ALMA, MICHIGAN.

PLASTIC-BLOCK-MOLDING MACHINE.

No. 826,289.

Specification of Letters Patent.

Patented July 17, 1906.

Application filed February 15, 1906. Serial No. 301,240.

*To all whom it may concern:*

Be it known that I, THEODORE F. TIMBY, a citizen of the United States of America, and a resident of Alma, in the State of Michigan, have invented a new and useful Improvement in Plastic-Block-Molding Machines, of which the following is a specification.

This invention relates, primarily, to hand-operated machines designed to facilitate and expedite the operations of making plastic blocks, especially building-blocks composed of hydraulic cement and sand and known as "cement" blocks.

The leading object of the present invention is to provide in one and the same machine for making either cored blocks or solid blocks at will and for readily adjusting the molds to make blocks of either kind of any desired size within the maximum capacity of the machine.

Other objects of the invention are to produce all the movements required to make and deliver the larger cored blocks except only the handling of the core and the feeding and tamping of the material by means of one and the same lever-handle; to provide at the same time for keeping the block-supporting pallet stationary while the other movable parts of the mold are in motion and for keeping the latter at rest while the pallet is being raised and lowered; to render the corners of the mold self-locking and to provide for unlocking the same and subsequently moving the ends and front of the mold outward simultaneously; to so construct the cams by which the movements of the front and ends of the mold are effected that they cannot be obstructed by sand or cement; to make the mold with interchangeable side and end plates supported by a skeleton frame, so as to adapt the same to be readily converted for blocks of different shapes and proportions; to provide for making cored blocks with faces of a different color or composition as compared with the body of the block; to provide for making several varieties of solid blocks by means of removable partitions; to bind the front and back of the solid-block mold by means of the partition-carrying frame; to keep the faces of the tampers horizontal at all times; to adapt one and the same set of tampers for the smallest and larger blocks; to keep the solid blocks in shape by means of the tampers while the ends and partitions are being removed, and to render the tamper-frame and the partition-carrying frame self-supporting in an out-of-the-way retracted position during the operation of making cored blocks.

Five sheets of drawings accompany this specification as part thereof.

Figure 12:
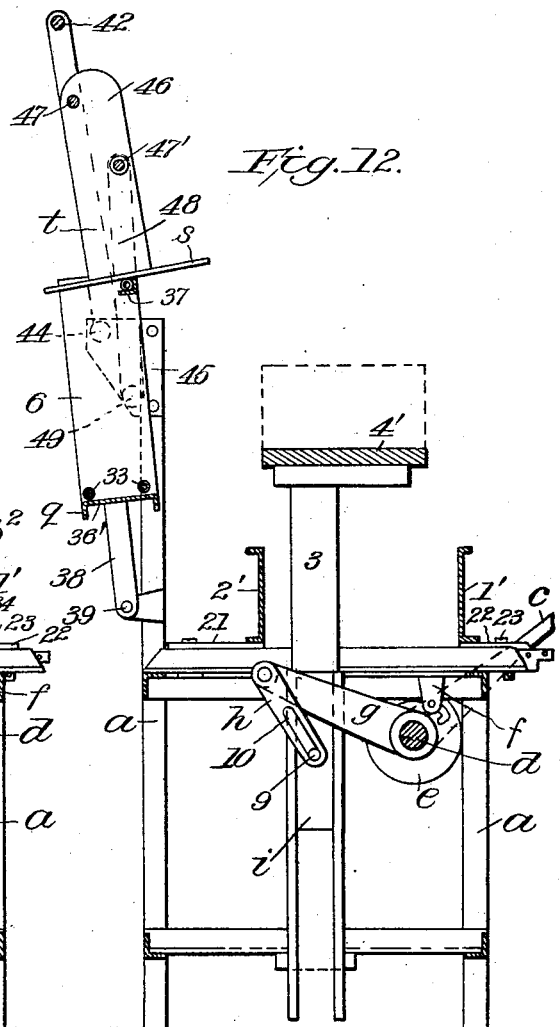
Figure 13:
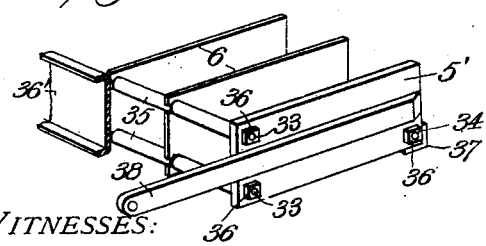
Figure 14:
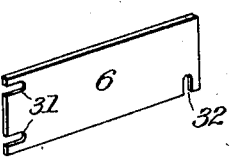

Figures 1 and 2 are top views of the convertible machine, showing it respectively in condition to mold a cored block and as it appears after removing the molded block by means of the pallet forming the bottom of the mold. Fig. 3 is a fragmentary top view illustrating the means whereby the ends of the cored-block mold are moved in opening and closing said mold. Fig. 4 is a front view of the machine, partly in section, on the line A B, Fig. 1. Fig. 5 is a detail view illustrating by full and dotted lines the means for moving the mold-fronts outwardly to unlock the corners of the cored-block mold and to free the blocks. Figs. 6 and 7 are end views of the machine corresponding, respectively, with Fig. 1 and Fig. 2. Figs. 8 and 9 are fragmentary views illustrating the provision for manipulating the front of the cored-block mold to provide for making blocks with faces of a different color or composition as compared with the body of the block, as aforesaid. Fig. 10 is a fragmentary perspective view showing the means for attaching the removable and interchangeable mold-backs to the main frame. Figs. 11 and 12 are central cross-sections of the machine converted for making solid blocks, illustrating, respectively, the molding operation and the operation of opening the mold. Fig. 13 is a fragmentary perspective view showing how the movable partitions of the solid-block mold are fastened in place within their frame. Fig. 14 is a perspective view of one of the partitions removed. Fig. 15 is a top view of the machine, showing the solid-block mold with its full complement of partitions as it appears after removing the hopper. Figs. 16 and 17 are elevations, respectively, of the front and back of the solid-block mold, and Figs. 18 and 19 are end views of these parts, respectively, detached.

Like reference characters refer to like parts in all the figures.

A suitable rigid frame $a$ is preferably and conveniently constructed of steel angle-bars, and the interchangeable and adjustable molds $b$ and $b^2$ of the improved machine are supported upon the top of the same in horizontal position and include in common an outwardly-movable front 1 or 1', a relatively stationary back 2 or 2′, and a pair of vertically-movable pallet-supports 3, upon which removable and interchangeable pallets 4 or 4′ are superposed to form the bottoms of the molds. The molds also include in common removable and interchangeable ends 5 and 5′, and a set of removable partitions 6 completes the mold equipment.

For moving the mold-front 1 or 1′ outwardly and subsequently elevating the pallet-supports 3 to deliver the molded blocks upon their pallets 4 or 4′ a hand-lever c is located at the right-hand end of the frame a, and a horizontal rock-shaft d, actuated by said hand-lever, is mounted longitudinally within the frame. A pair of cams e, carried by said rock-shaft, are constructed with slots 7 in their outer sides. A pair of horizontal slides f are provided with antifriction-rollers 8 to interact with said slots 7, and a mold-front 1 or 1′ is attached directly or indirectly to these slides. Said slots 7 of the cams e include inwardly-extended front ends 7′, which are their effective portions and temporarily interlock with said rollers 8 to transmit motion to said slides. The remainder of each slot is concentric with said rock-shaft d, and the slides f remain at rest while the rollers 8 are within these concentric portions.

For actuating the pallet-supports 3 the rock-shaft d is further provided with a pair of downwardly-projecting crank-arms g. A longitudinally-slotted link h is pivoted to the lower end of each of said crank-arms, and vertical slides i, forming the main parts of said pallet-supports 3, are provided with stud-pins 9 to interact with the slots 10 of said links. During the movement of the mold-front 1 or 1′ the slots 10 of said links h adapt them to play freely back and forth without affecting the pallet-supports. Subsequently at the proper moment the links h transmit motion through the stud-pins 9 to said vertical slides i, and the pallet 4 or 4′ is raised to the required extent for the delivery of the molded blocks above the mold-front. The blocks are then carried off upon their pallets and set aside for curing and drying.

The movements above described are common to both uses of the convertible machine.

When the convertible machine is organized for making cored blocks, such as foundation building-blocks, the movable solid-block mold ends 5′ and partitions 6 are supported in an out-of-the-way elevated position, as in Figs. 1, 2, 4, 6, and 7, and the appropriate mold parts 1, 2, and 5 for this operation are attached. These mold parts include a mold-front 1, having locking ends 11 at its lateral extremities, adapted to interlock with the mold ends 5 when the mold is closed, so as to resist any spreading of the mold, especially at its front, where accurate measurement is most essential, the effective portions 7′, Fig. 5, of said peripheral slots 7 of the cams e having as their first function the movement of the mold-front outwardly to unlock said corners.

The cored-block mold b also includes outwardly-movable ends 5, and provision is made for transmitting motion to these ends from the same hand-lever and rock-shaft, as follows: Said cams e are further constructed with peripheral slots 12, Fig. 5, having effective portions 12′ and straight portions, which interact successively with antifriction-rollers 13 on the lower sides of horizontally-swinging levers j, interposed between pivotal supports 14 at the front of the frame and central depending studs 15 on horizontal slides k, to the tops of which said ends 5 are attached, said levers being slotted at the point last named, so as to prevent binding. The construction of the cams e is such that during said forward movement of the mold-front 1 to unlock the corners of the mold said rollers 13 are within the straight portions of said slots 12, and the mold ends 5 remain at rest until the unlocking operation is completed. The rollers 13 then interact with said effective portions 12′ of said slots 12, and motion is transmitted to the mold-front 1 and mold ends 5 in unison.

In preparing the cored-block mold to receive the cement after the mold front 1, back 2, and ends 5 are attached and closed by means of the hand-lever c a core l is inserted upon the pallet 4. The mold is then filled around the core in customary manner until it is full, and the surplus material is removed by means of a striking bar or plate, so as to leave the top of the block level. The core l being slightly tapered is then removed upward by hand. The hand-lever c is then operated, and by means of motion transmitted therefrom, as aforesaid, the mold-front 1 is first moved sufficiently to unlock the corners of the mold, the front 1 and the ends 5 are then simultaneously moved outwardly to free the block, and the block-supporting pallet 4 is then elevated clear of the front and ends of the mold.

To provide for making such blocks of different widths, as well as of different lengths within the capacity of the machine, and to provide for varying the shapes or configurations of the front and ends at least at will, as well as to insure strong and rigid molds, said front 1, back 2, and ends 5 of the cored-block mold, or the front 1 and ends 5 at least, are constructed with light rigid frames m, of angle-steel, and with removable plates n, of cast-iron, the backs of said plates having hooks 16, Fig. 4, to interlock with the horizontal bars of said frames m in fastening the plates n in place. Said plates n of the ends 5 are constructed with projections 17, adapted to provide the ends of the blocks with the customary vertical recesses, and also preferably by means of central round or oval face portions 18 to form handholds within such vertical recesses, adapted to be used with either horizontal face of the block uppermost.

Slots 19, 19', and 20, Figs. 1 and 2 and Fig. 15, render the fronts 1 and 1' and the ends 5 adjustable for larger and smaller blocks. The mold-backs 2 and 2' are in common adjustably attached in the manner illustrated by Fig. 10. The feet 21 of the back are adjustable back and forth in the space between parallel angle-bars 21$^a$, which extend across the top of the frame $a$ and also support the front slides $f$. The vertical bolts 21$^b$, Fig. 10, by which the back 2 or 2' is clamped in position, extend upwardly through bridge-pieces 21$^c$, Fig. 10, which interact with the bottoms of said bars 21$^a$. The bolts may instead have T-heads at bottom to interact with the angle-bars.

To provide for making the cored blocks with faces of a different color or material as compared with the body of the block, a tilting piece $o$ is interposed between each of said front slides $f$ and the slotted feet 22 of the mold-front 1, as shown in Fig. 8. This tilting piece $o$ is provided with a tapped hole to receive a vertical bolt 23, clamping the mold-front in place, and is hinged to the top of the slide by a horizontal pintle 24, Figs. 5 and 8, and extended in front of the pintle, as shown at 25, to a sufficient extent to adapt it to turn in between extensions 26 of the sides of the slide to form a support for the mold-front 1 when the latter is turned forward to a horizontal position. (See Fig. 8.) In this position the facing material is spread upon the mold-front 1 to the required thickness, and over this a sheet-metal shield $p$, Fig. 9, is attached. The front 1 is then turned into its vertical position, Fig. 6, and the mold is closed and filled, as before, except that during the filling operation the shield $p$ is withdrawn step by step as the filling proceeds, so as to allow the face material to become united with the body material. To increase the bond between the face material and the body material, the back of the facing material is grooved or corrugated by corrugations in the shield $p$, as shown in Fig. 8. To fasten the front 1 against such tilting movement when it is not required, the slides $f$ and tilting pieces $o$ are provided with holes 27 to interact with locking-pins 28, extending through ends of the slides $f$, as in Figs. 5 and 6.

To convert the machine for making solid blocks, said mold-front 1, back 2, and ends 5 of the cored-block mold are detached, and the substitute front 1' and back 2' of the solid-block mold are fastened in place, the bolts, which attach the mold-front in this case, extending through said tilting pieces $o$ on the front slide $f$ into threaded holes 29, Fig. 8, formed within the slides $f$ themselves. A pallet 4' is placed in position between the mold front and back, the mold-front 1' having been moved into effective position by the hand-lever $c$, if not already in position. A swinging frame $q$ at the back of the mold is then lowered by means of handles 30 at its ends and completes the mold $b'$ by adding its ends 5' and any desired number of the partitions 6, if partitions are needed to produce the desired size of block.

The whole length of the mold may be used for making window-sills and the like, or by adding all the partitions 6 the material may be subdivided into small building-blocks, or by removing alternate partitions or any required number the interior of the mold may be subdivided as to length in any desired way. To render said partitions 6 easily and quickly removable and replaceable at will, they are held in place in the manner illustrated by Figs. 13 and 14—that is to say, each partition is provided at its rear end with a pair of notches 31, Fig. 14, and at its lower front corner with a single notch 32, Fig. 14, and these notches are engaged by horizontal rods 33 and 34, Fig. 13, forming parts of said swinging frame $q$, and provided with gas-pipe spacing-sleeves 35, Fig. 13, and with clamping-nuts 36 at the ends of each rod, so that it is only necessary when the clamping-nuts are loosened to unhook the partitions from the rods beginning at the lower front rod, or to replace them in like manner, and by tightening the nuts 36 the equipment, whatever that may be, is tightly clamped against accidental displacement. The mold ends 5' are relatively inseparable parts of the swinging frame $q$, the other members of which are a back piece 36', flanged to support said rods 33, an angle-bar 37 in front to support and supplement the rod 34, and arms 38 at its ends extending rearwardly to its pivots 39, which are supported by upward extensions of the rear corner-posts of the main frame $a$.

When any of the partitions 6 are omitted in the process of making solid blocks, the corresponding slots 40 and 41, Figs. 16 and 17, in the front 1' and back 2' of the mold may be closed by sheet-metal lining-pieces; but as these slots need not be more than one-eighth of an inch wide it is not absolutely necessary that they be closed when the partitions are not in use. After the solid-block mold $b'$ is completed, as represented in Figs. 11 and 15, a detachable hopper $r$, Fig. 11, is applied thereto and the two are filled with cement to the top of the hopper. The operative in charge of the machine then strikes off the surplus material at the top of the hopper to insure a uniform quantity of the cement for each block, if there be more than one, or at the several parts of the block, if there be but one. The cement is then compressed by means of tampers $s$, of which there are preferably and conveniently as many as the compartments of the mold $b^2$ when all the partitions 6 are in use. The faces of the set of tampers at their lower ends correspond substantially in joint area with the horizontal area of the interior of the mold. The tampers are lowered into position by means of a downwardly and upwardly swinging frame t and manipulated by means of its handle-bar 42 to solidify the contents of the mold. The tamper-frame t includes said handle-bar 42 and a pair of end bars 43, united at their front ends by said handle-bar and extending rearwardly therefrom to the tamper-frame pivots 44, which are supported by rearwardly-projecting brackets 45 at the upper ends of said extensions of the rear corner-posts of the main frame a. Its other element is a horizontal rod 47, extending through said end bars 43 and through the stem 46 of each of the tampers s.

To keep the faces of the tampers s horizontal, the stems 46 are connected at another point by a rod 47' with a pair of end bars 48, parallel with said end bars 43, swinging on lower pivots 49, attached to the same brackets 45.

When the molding operation is completed, the tamper-frame t is restored to its elevated position and the hopper r is drawn forward in such a way as to serve as a scraper or striker to remove any surplus cement at the top of the mold. The tampers s are then again lowered, so as to rest lightly on the top of the block or blocks. The lower swinging frame q is then lifted by means of its end handles until the partitions 6 or mold ends 5' reach contacts 50, attached to or formed on or by parts of the tamper-frame t or parts moving therewith. The lower frame q and the tamper-frame t are then raised together and restored to their respective elevated positions, both of them falling back of their centers of gravity sufficiently to render them self-supporting.

To provide for holding the hand-lever c in its respective positions of rest, the frame a is preferably and conveniently provided with detents 51 and 52, which may be of any known or improved construction. The machine may thus be adapted to be worked by a single operative.

Instead of operating the machine by hand it may obviously be operated by one or more treadles, or by hand and foot jointly, or the tampers may be reciprocated by power, if preferred.

The cams e may obviously be made with grooves or flanges instead of the described slots; but the slotted cams are free from liability to obstruction by sand or cement, which is a great advantage in practice.

Other like modifications will suggest themselves to those skilled in the art.

Having thus described said improvement, I claim as my invention and desire to patent under this specification—

1. A plastic-block-molding machine having, in combination with a suitable supporting-frame, a block-mold having an outwardly-movable front and vertically-movable pallet-supports, a removable pallet within the mold, and means for moving said front to free the molded block and for subsequently moving said pallet-supports to elevate the block-supporting pallet including a horizontal rock-shaft means for actuating said rock-shaft and suitable motion-transmitting and lost-motion devices connecting said rock-shaft with the mold-front and with the pallet-supports.

2. A plastic-block-molding machine having, in combination with a suitable supporting-frame, a block-mold comprising a removable front movable outwardly to free the molded block, a removable back, removable ends and vertically-movable supports for removable and interchangeable pallets within the mold, and means for moving the attached front to free the molded block and for subsequently moving said pallet-supports to elevate the block-supporting pallet including a horizontal rock-shaft means for actuating said rock-shaft and suitable motion-transmitting and lost-motion devices connecting said rock-shaft with the mold-front and with the pallet-supports.

3. A plastic-block-molding machine having, in combination with a suitable supporting-frame, a block-mold including an outwardly-movable front, a removable pallet within the mold, vertically-movable pallet-supports, and means for moving said front to free the molded block and for moving the pallet-supports to elevate the molded block upon its pallet, such means including a horizontal rock-shaft, a pair of cams fast on said rock-shaft, motion-transmitting parts interacting with said cams and horizontal slides to which motion is transmitted by these parts and to which the mold-front is attached, crank-arms carried by said rock-shaft and vertical slides to which said crank-arms are connected and to which said pallet-supports are attached.

4. A plastic-block-molding machine having, in combination with a suitable supporting-frame, a block-mold including an outwardly-movable front, a removable pallet within said mold, vertically-movable pallet-supports, and means for moving said front to free the molded block and for subsequently moving the pallet-supports to elevate the molded block upon its pallet, such means including a horizontal rock-shaft, a pair of cams fast on said rock-shaft and constructed with slots having effective and lost-motion portions, motion-transmitting parts interacting with said slots and horizontal slides to which motion is transmitted by these parts and to which the mold-front is attached, crank-arms carried by said rock-shaft, lost-motion links pivoted to the lower ends of said crank-arms, and vertical slides to which said links are connected and to which said pallet-supports are attached.

5. A plastic-block-molding machine having, in combination with a suitable supporting-frame, a convertible block-mold comprising either of two interchangeable fronts movable outwardly to free the molded block, either of two interchangeable backs, either of two sets of interchangeable ends and removable partitions parallel with the ends, one set of ends together with the partitions being mounted in an upwardly-swinging frame and supported thereby in a retracted position above and behind the mold when the other mold ends are in use, vertically-movable supports for removable and interchangeable pallets within the mold, and means for moving the attached front to free the molded block and for subsequently moving said pallet-supports to elevate the block-supporting pallet.

6. A plastic-block-molding machine having, in combination with a suitable supporting-frame, a superposed convertible block-mold including removable ends, and removable partitions parallel with the ends, one set of ends together with the partitions being mounted in an upwardly-swinging frame and supported thereby in a retracted position above and behind the mold when the other ends are in use, and a set of tampers mounted in a downwardly and upwardly swinging frame and supported thereby in a retracted position above and behind the mold when not in use, said tamper-supporting frame being arranged in its retracted position above said partition-supporting frame and adapted to be lifted by means of the latter in restoring the swinging frames to their retracted positions.

7. A plastic-block-molding machine having, in combination with a suitable supporting-frame, a superposed mold constructed with an outwardly-movable front, and outwardly-movable ends constructed in common with rigid skeleton frames of angle-steel having horizontal bars and removable mold-plates having hooks on their backs which interlock with said horizontal bars for fastening the plates in position, and means for moving said front and ends to free the molded block.

8. A plastic-block-molding machine having, in combination with a suitable supporting-frame, a superposed mold constructed with an outwardly-movable front, a removable core-supporting pallet within the mold, vertically-movable pallet-supports, and means for moving said front to free the molded block and for subsequently moving the pallet-supports to elevate the molded block upon its pallet clear of said front, said means including horizontal slides to the tops of which said front is attached and tilting pieces interposed between said front and said slides and hinged to the latter by horizontal pintles, whereby said front is further adapted to be tilted forward to facilitate molding the block with a face of a different color or material as compared with the body of the block.

9. A plastic-block-molding machine having, in combination with a suitable supporting-frame, a superposed mold constructed with an outwardly-movable front, and means for moving said front to free the molded block, such means including horizontal slides to the tops of which said front is attached and tilting pieces interposed between said front and said slides and hinged to the latter by horizontal pintles so that the front may be tilted into a horizontal position the front ends of said slides and said tilting pieces being constructed with interacting extensions for supporting the front in its horizontal position.

10. A plastic-block-molding machine having, in combination with a suitable supporting-frame, a superposed mold including an outwardly-movable front and outwardly-movable ends, a removable pallet within the mold, vertically-movable pallet-supports, and means for moving said front and said ends to free the molded block and for moving said pallet-supports to elevate the molded block upon its pallet, such means including a horizontal rock-shaft, a pair of cams fast on said rock-shaft and each constructed with side and peripheral slots, motion-transmitting parts interacting with said slots respectively, and horizontal slides to which motion is transmitted by these parts and to which the mold front and ends are attached, crank-arms carried by said rock-shaft and vertical slides to which said crank-arms are connected and to which said pallet-supports are attached.

11. A plastic-block-molding machine having, in combination with a suitable supporting-frame, a superposed mold including an outwardly-movable front and outwardly-movable ends, a removable pallet within the mold, vertically-movable pallet-supports, and means for moving said front and said ends to free the molded block and for subsequently moving the pallet-supports to elevate the molded block upon its pallet, such means including a horizontal rock-shaft, a pair of cams fast on said rock-shaft and each constructed with side and peripheral slots, said parts having effective and lost-motion portions, motion-transmitting parts interacting with said slots respectively and horizontal slides to which motion is transmitted by these parts and to which the mold front and ends are attached, crank-arms carried by said rock-shaft, links having lost-motion slots pivoted to the lower ends of said crank-arms and vertical slides to which said links are connected and to which said pallet-supports are attached.

12. A plastic-block-molding machine having, in combination with a suitable supporting-frame, a superposed mold including an outwardly-movable front and outwardly-movable ends normally interlocked with each other at the front corners of the mold and means for unlocking said corners and subsequently moving said front and ends in unison to free the molded block, such means including a horizontal rock-shaft, a pair of cams fast on said rock-shaft and each constructed with side and peripheral slots, motion-transmitting parts interacting with said slots respectively, horizontal slides to which motion is transmitted by these parts and to which the mold front and ends are attached, said side slots having effective portions which operate to unlock the front and to continue its outward motion and lost-motion portions concentric with the rock-shaft and said peripheral slots having effective portions which operate to move the mold ends outwardly in unison with the motion of the front after the latter is unlocked.

13. A plastic-block-molding machine having, in combination with a suitable supporting-frame, a superposed mold including an outwardly-movable front and outwardly-movable ends, said front having end flanges adapted to interlock with said ends to form corner-locks when the mold is closed, a removable pallet within the mold, vertically-movable pallet-supports, and means for moving said front and said ends and for subsequently moving said pallet-supports, such means including a horizontal rock-shaft, a pair of cams fast on said rock-shaft and each constructed with side and peripheral slots, motion-transmitting parts interacting with said slots respectively, horizontal slides to which motion is transmitted by these parts and to which the mold front and ends are attached, crank-arms carried by said rock-shaft, and vertical slides to which said crank-arms are connected and to which said pallet-supports are attached, said side slots having effective portions which operate to unlock the front and to continue its outward motion and lost-motion portions concentric with the rock-shaft, said peripheral slots having effective portions which operate to move the mold ends outwardly in unison with the motion of the front after the latter is unlocked, and said crank-arm connections having lost-motion slots which cause said pallet-supports to remain at rest until the movements of said front and ends are completed.

14. A plastic-block-molding machine having, in combination with a suitable supporting-frame, a superposed mold including an outwardly-movable front, a relatively stationary back and movable ends, an upwardly-swinging frame in which the mold ends are supported, a removable pallet within the mold, vertically-movable pallet-supports, means for moving said front and said pallet-supports, such means including a horizontal rock-shaft, a pair of cams fast upon said rock-shaft, motion-transmitting parts interacting with said cams, horizontal slides to which motion is transmitted by these parts and to which the mold-front is attached, crank-arms carried by said rock-shaft and vertical slides to which said crank-arms are connected and to which said pallet-supports are attached.

15. A plastic-block-molding machine having, in combination with a suitable supporting-frame, a superposed mold including an outwardly-movable front, a relatively stationary back and movable ends, an upwardly-swinging frame in which the mold ends are supported, a removable pallet within the mold, vertically-movable pallet-supports, means for moving said front to free the molded block and for subsequently moving said pallet-supports to elevate the block-supporting pallet, such means including a horizontal rock-shaft, a pair of cams fast on said rock-shaft and constructed with side slots, motion-transmitting parts interacting with said slots, horizontal slides to which motion is transmitted by these parts and to which the mold-front is attached, crank-arms carried by said rock-shaft and vertical slides to which said crank-arms are connected and to which said pallet-supports are attached, said slots having effective portions which operate to move the mold-front and lost-motion portions concentric with the rock-shaft, and said crank-arm connections having lost-motion slots which cause the pallet-supports to remain at rest until the block-freeing movement is completed.

16. A plastic-block-molding machine having, in combination with a suitable supporting-frame, a superposed mold including an outwardly-movable front, a relatively stationary back, movable ends and removable partitions parallel with said ends, an upwardly-swinging frame in which the mold ends together with the partitions are supported and adapted to bind together the mold front and back during the molding operation and to remove the mold ends and partitions in the act of freeing the outwardly-movable front preliminary to the movement of the latter, and means for effecting the movement last named.

17. A plastic-block-molding machine having, in combination with a suitable supporting-frame, a superposed mold including an outwardly-movable front, a relatively stationary back, movable ends and removable partitions parallel with said ends, an upwardly-swinging frame in which the mold ends and partitions are supported, a removable pallet within the mold, vertically-movable pallet-supports, and means for moving said front to free the block and for subsequently moving said pallet-supports to elevate the block-supporting pallet; said upwardly-swinging frame serving to bind the front and back of the mold together during the molding operation, and to remove the mold ends and partitions preliminary to said outward movement of the mold-front.

18. A plastic block-molding machine having, in combination with a suitable supporting-frame, a superposed mold including an outwardly-movable front, a relatively stationary back, movable ends and movable partitions parallel with said ends, and an upwardly-swinging frame in which said mold ends and partitions are supported, including horizontal rods at its front and back, provided with sleeves and with clamping-nuts at the ends of each rod, said partitions having notches to interlock with said rods between said sleeves so as to be clamped in place by means of said nuts, whereby the mold is adapted to be used with any desired number of said partitions.

19. A plastic-block-molding machine having, in combination with a suitable supporting-frame and a superposed mold, a horizontally-removable hopper supported upon said mold and adapted to be used as a scraper to strike off the top of the mold, tampers arranged for use within said hopper to consolidate the material within the mold while the hopper is in place, and a downwardly and upwardly swinging frame in which said tampers are mounted and by which they are normally supported in an out-of-the-way elevated position.

20. A plastic-block-molding machine having, in combination with a suitable frame and a superposed mold, a hopper removably supported upon said mold, tampers arranged for operation within said hopper, a downwardly and upwardly swinging frame by which said tampers are raised and lowered and by which they are normally supported in an out-of-the-way elevated position, and means movable with said swinging frame whereby the faces of said tampers are rendered horizontal at all times.

21. A plastic-block-molding machine having, in combination with a suitable frame and a superposed mold, a hopper removably supported upon said mold, tampers arranged for operation within said hopper, a downwardly and upwardly swinging frame by which said tampers are raised and lowered and by which they are normally supported in an out-of-the-way elevated position, said frame including a pair of end bars united at their front ends by a handle-bar, and means movable with said swinging frame whereby the faces of said tampers are rendered horizontal at all times, the means last named including downwardly and upwardly swinging arms parallel with said end bars, and a horizontal rod connecting said arms and extending through upwardly-extending portions of the several tampers.

22. A plastic-block-molding machine having, in combination with a suitable supporting-frame, a superposed mold including an outwardly-movable front, a relatively stationary back, movable ends, a downwardly and upwardly swinging frame in which said ends are supported and which serves in connection with said ends to bind the front and back of the mold together during the molding operation, a removable hopper supported upon the mold during the molding operation, tampers arranged and adapted for use within said hopper during the molding operation and to rest upon the molded block after the removal of the hopper, and a downwardly and upwardly swinging frame within which said tampers are supported and by which they are manipulated; the swinging frame first named being adapted to interact with the tamper-frame in the act of moving the mold ends to free the outwardly-movable mold-front after said ends are partly removed from contact with the molded block, whereby the tampers are adapted to rest upon the molded block during such removal of the mold ends and to be lifted together with the latter at one and the same operation.

23. A plastic-block-molding machine having, in combination with a suitable frame, a superposed mold constructed with an outwardly-movable front, a relatively stationary back, movable ends and movable partitions parallel with said ends, a removable pallet within said mold, vertically-movable pallet-supports, an upwardly-swinging frame for moving the mold ends and partitions, means for subsequently moving said front to free the molded block and for thereafter moving said pallet-supports to elevate the block-supporting pallet, a removable hopper adapted to be supported upon said mold during the molding operation, tampers arranged and adapted to operate within said hopper and to rest upon the molded block after the removal of the hopper and during the withdrawal of the mold ends and partitions, means whereby said tampers are normally supported in elevated position including a downwardly and upwardly swinging frame movable with the swinging frame first named after the mold ends and partitions are sufficiently removed from contact with the molded block, and pivotal supports for said swinging frames whereby they are in common adapted to remain in their elevated positions by swinging over and behind their centers of gravity.

24. A plastic-block-molding machine having, in combination with a suitable frame, a superposed mold constructed with an outwardly-movable front, a relatively stationary back and movable ends, an upwardly-swinging frame for moving the mold ends, means for subsequently moving said front to free the molded block, a removable hopper adapted to be supported upon said mold during the molding operation, tampers arranged and adapted to operate within said hopper and to rest upon the molded block after the removal of the hopper and during the withdrawal of the mold ends, means whereby said tampers are normally supported in elevated position including a downwardly and upwardly swinging frame movable with the swinging frame first named after the mold ends are sufficiently removed from contact with the molded block, and pivotal supports for said swinging frames whereby they are in common adapted to remain in their elevated positions by swinging over and behind their centers of gravity.

25. A plastic-block-molding machine having, in combination with a suitable frame, a superposed mold constructed with an outwardly-movable front, a relatively stationary back and movable ends and partitions, an upwardly-swinging frame for moving the mold ends and partitions, means for subsequently moving said front to free the molded block, a removable hopper adapted to be supported upon said mold during the molding operation, tampers arranged and adapted to operate within said hopper and to rest upon the molded blocks after the removal of the hopper and during the withdrawal of the mold ends and partitions, means whereby said tampers are normally supported in elevated position including a downwardly and upwardly swinging frame movable with the swinging frame first named after the mold ends and partitions are sufficiently removed from contact with the molded block, and pivotal supports for said swinging frames whereby they are in common adapted to remain in their elevated positions by swinging over and behind their centers of gravity.

26. A plastic-block-molding machine having, in combination with a suitable frame, a superposed mold constructed with an outwardly-movable front, a relatively stationary back movable ends and movable partitions, a removable pallet within said mold, vertically-movable pallet-supports, an upwardly-swinging frame for withdrawing said mold ends and partitions, means for subsequently moving said front to free the molded block and for thereafter moving said pallet-supports to elevate the block-supporting pallet, a removable hopper adapted to be supported upon said mold during the molding operation, tampers arranged and adapted to operate within said hopper and to rest upon the molded block after the removal of the hopper and during the withdrawal of the mold ends and partitions, means whereby said tampers are normally supported in elevated position including a downwardly and upwardly swinging frame movable with the swinging frame first named after the mold ends and partitions are sufficiently removed from contact with the molded block, said swinging frames having a lost-motion connection with each other and pivotal supports for said swinging frames whereby they are in common adapted to remain in their elevated positions by swinging over and behind their centers of gravity, substantially as hereinbefore specified.

THEODORE F. TIMBY.

Witnesses:
JAS. L. EWIN,
A. M. SPOFFORD.